(12) United States Patent
Goss et al.

(10) Patent No.: US 11,640,336 B2
(45) Date of Patent: May 2, 2023

(54) FAST CACHE WITH INTELLIGENT COPYBACK

(71) Applicant: Seagate Technology LLC, Fremont, CA (US)

(72) Inventors: Ryan J. Goss, Prior Lake, MN (US); Jack V. Anderson, Shakopee, MN (US); Jonathan M. Henze, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/380,655

(22) Filed: Jul. 20, 2021

(65) Prior Publication Data
US 2022/0027234 A1    Jan. 27, 2022

Related U.S. Application Data

(60) Provisional application No. 62/705,972, filed on Jul. 24, 2020.

(51) Int. Cl.
*G06F 11/10* (2006.01)
*G06F 11/07* (2006.01)
*G06F 3/06* (2006.01)

(52) U.S. Cl.
CPC ........ *G06F 11/1068* (2013.01); *G06F 3/0619* (2013.01); *G06F 3/0629* (2013.01); *G06F 3/0679* (2013.01); *G06F 11/073* (2013.01)

(58) Field of Classification Search
CPC .... G06F 3/0619; G06F 3/0629; G06F 3/0679; G06F 11/1044; G06F 11/1064; G06F 11/1068
See application file for complete search history.

(56) References Cited

U.S. PATENT DOCUMENTS

2015/0082122 A1* 3/2015 Udipi ................ G06F 11/1044
714/764
2020/0081771 A1* 3/2020 Kalamatianos ..... G06F 11/1064

* cited by examiner

*Primary Examiner* — Shelly A Chase
(74) *Attorney, Agent, or Firm* — Hall Estill Law Firm

(57) ABSTRACT

Method and apparatus for intelligent caching, protection and transfers of data between a cache and a main memory in a data storage environment, such as but not limited to a solid-state drive (SSD). A main memory (MM) has non-volatile memory (NVM) cells configured for persistent storage of user data. A fast response cache (FRC) has NVM cells configured to provide storage of first data prior to transfer to the MM. A write cache (WC) has NVM cells configured to provide storage of second data prior to transfer to the MM. A controller directs input data to either the FRC or the WC. A first type of error correction encoding (ECC1) is applied to the first data and a different, second type of error correction encoding (ECC2) is applied to the second data. Data may be sent from the FRC to the MM either directly or through the WC.

22 Claims, 4 Drawing Sheets

FAST CACHE WITH INTELLIGENT COPYBACK

RELATED APPLICATION

The present application makes a claim of domestic priority under 35 U.S.C. 119(e) to U.S. Provisional Application No. 62/705,972 filed Jul. 24, 2020, the contents of which are hereby incorporated by reference.

SUMMARY

Various embodiments of the present disclosure are generally directed to intelligent caching, protection and transfers of data between a cache and a main memory in a data storage environment, such as but not limited to a solid-state drive (SSD).

In some embodiments, a main memory (MM) has non-volatile memory (NVM) cells configured for persistent storage of user data. A fast response cache (FRC) has NVM cells configured to provide storage of first data prior to transfer to the MM. A write cache (WC) has NVM cells configured to provide storage of second data prior to transfer to the MM. A controller directs input data to either the FRC or the WC. A first type of error correction encoding (ECC1) is applied to the first data and a different, second type of error correction encoding (ECC2) is applied to the second data. Data may be sent from the FRC to the MM either directly or through the WC.

These and other features which may characterize various embodiments can be understood in view of the following detailed discussion and the accompanying drawings.

DETAILED DESCRIPTION

Figure 1:
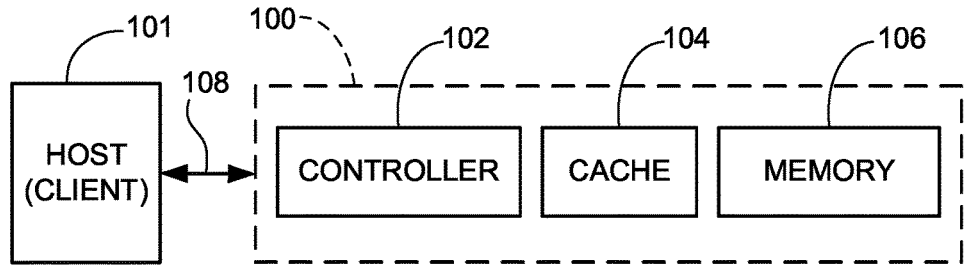
FIG. 1 provides a functional block representation of a data storage device coupled to a host (client) device in accordance with various embodiments.

Data storage devices are used to store and retrieve computerized data in a fast and efficient manner. A currently popular form of storage device is a solid-state drive (SSD), which uses solid-state non-volatile memory (NVM) as a main memory store for user data from a client device. The NVM in an SSD may be configured as three-dimensional (3D) NAND flash memory, but other forms of solid-state memory can be used. While SSDs are particularly useful in providing fast data transfer performance, other forms of data storage devices are commonly employed such as magnetic disc recording devices, optical disc recording devices, magnetic tape devices, hybrid data storage devices, etc. Similarly, SSDs can be arranged with substantially any form of semiconductor based NVM cells.

A data cache can be provided as a front end memory location to temporarily store input data prior to transfer to the main memory store. In this way, data to be transferred to a data storage device can be received and processed quickly, allowing the client device to move on to other data transfer operations such as further transfers of data for storage (e.g., writes) and requests for the retrieval of data from the main store (e.g., reads). The storage device can operate in the background to manage the cache and process the internal transfers of the cached data to the main NVM in a way that does not significantly impact client performance.

While a number of cache management strategies have been proposed in the art, there remains a continual need for improvements to enhance data transfer performance and reliability. It is to these and other improvements that various embodiments of the present disclosure are generally directed.

Various embodiments present an apparatus and method for cache management in a data storage device. As explained below, some embodiments provide the data storage device with a main memory (MM), a dedicated fast response cache (FRC) and a controller.

The MM may take the form of flash memory cells each configured to store multiple bits of data, although other forms of main memory can be used. The FRC may take the form of specially configured flash memory cells each configured to store a single bit of data. Other forms of data cells can be used, including without limitation RRAM cells, MRAM cells, STRAM cells, phase change memory cells, ferroelectric memory cells, etc. The controller may take the form of a programmable processor and associated circuitry to control data transfers to and from the respective cache and main memory, a hardware circuit, etc.

During transfers of data between a host (client) device and the MM, the controller may operate to apply a first type of error correction encoding ("ECC1") to groups of cached data sent to the FRC. The ECC1 may be based on target locations in the MM for the cached data in the FRC. The controller may further operate to copyback the groups of the cached data to the MM using a different, second type of ECC encoding ("ECC2"). The term "copyback" will be generally understood as describing an internal data transfer operation from one memory location to another that does not involve involvement of an external device (e.g., host); data resident in one internal memory location are transferred to another internal memory location during a copyback operation. The copyback operations can be governed by, but are not limited to, the strictures provided by the ONFI (Open NAND Flash Interface Working Group).

In some cases, the MM may be arranged as a plurality of semiconductor memory dies that are arranged in die sets coupled to a plurality of parallel channels (lanes), and the copyback operation takes place along the parallel channels. The ECC1 and ECC2 encoding schemes may be selected to optimize the transfers along the channels.

In further cases, the FRC may comprise flash memory cells adapted with associated circuitry to only store a single bit per cell (e.g., single level cells, or SLCs). It is contemplated albeit not necessarily required that the FRC may be so-called "XL NAND" cells that provide a faster SLC response than the response obtained from the configuration of the flash memory cells in the main memory as SLCs. However, the particular construction and operation of the FRC can vary; other constructions can be provided for the FRC as required.

Regardless, the FRC is managed by the controller to provide fast client input/output (I/O) transfer performance while arranging the data in such a way as to efficiently transfer the cached data from the fast response cache to the MM. This transfer can occur directly from the FRC to the MM, or can be carried out indirectly by passing the data from the FRC to a write cache (WC) prior to transfer to the MM.

These and other features and advantages of various embodiments can be understood beginning with a review of FIG. 1, which provides a functional block representation of a data storage device 100. The data storage device 100 is coupled to an external host (client) device 101 to form a data computational system such as in a computer network. The storage device 100 incorporates a controller 102, a fast response cache 104 and main a memory module 106.

The controller 102 represents a hardware based and/or programmable processor based circuit configured to provide top level communication and control functions. The fast response cache 104 provides a data cache as a temporary storage location for input user data from the client device 101. The main memory 106 provides a non-volatile memory (NV NI) to provide long term persistent storage of the input user data. While not limiting, as explained below both the fast response cache 104 and the main memory 106 may take the form of solid-state memory, such as various types of NAND flash memory.

Figure 2:
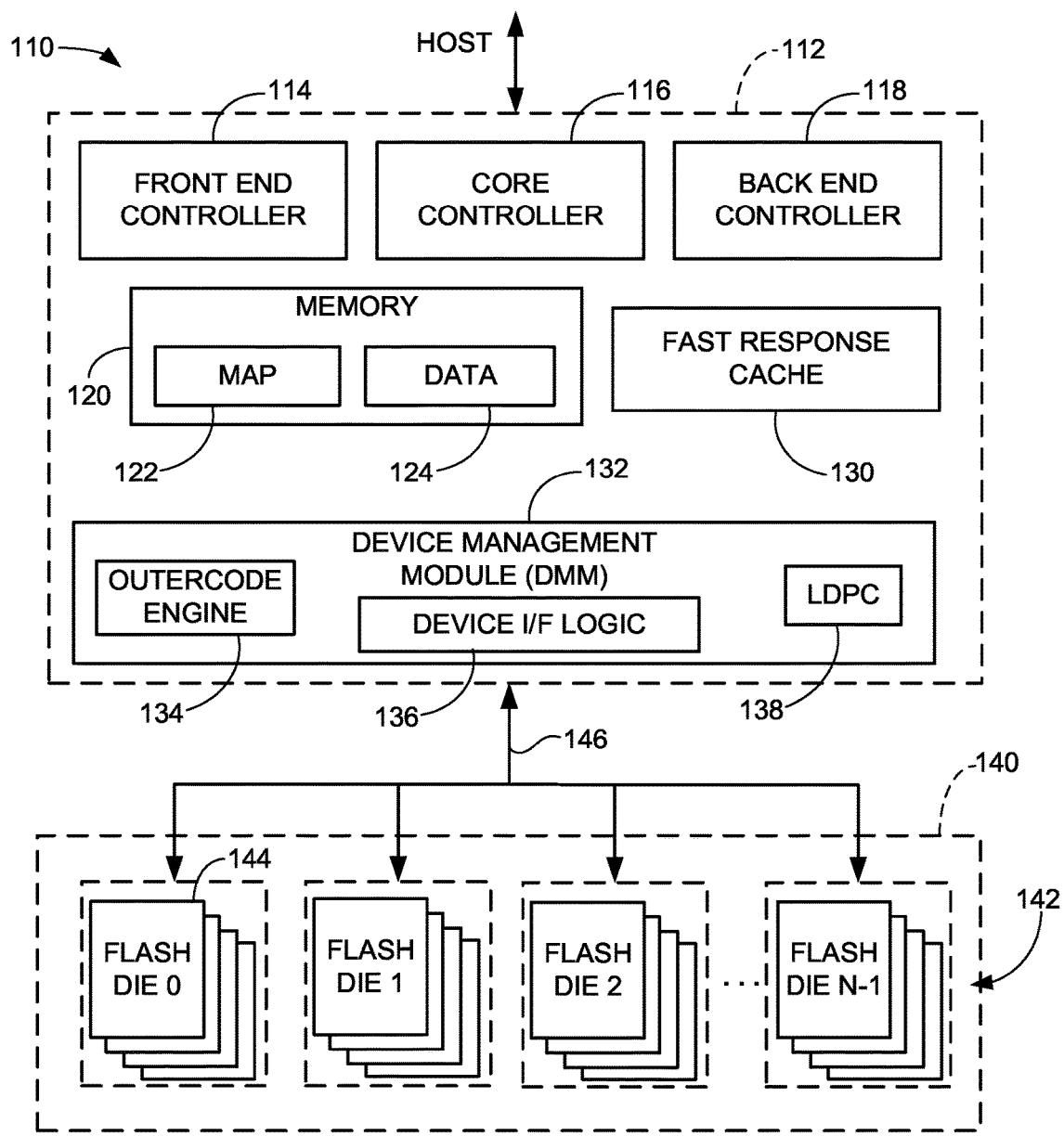
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more client devices via any number of suitable interfaces, such as one or more Peripheral Component Interface Express (PCIe) ports, Serial Attached SCSI (SAS) ports, etc. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data. Each die set may form a portion of an NVMe namespace that may span multiple SSDs or be contained within a single SSD.

The SSD 110 includes a controller circuit 112 that generally corresponds to the controller 102 of FIG. 1. The controller circuit 112 includes a front end controller 114, a core controller 116 and a back end controller 118. The front end controller 114 performs host I/F functions, the back end controller 118 directs data transfers with the memory module and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more metadata map structures 122 and one or more sets of user data 124 that are cached or buffered during data transfers with a client (e.g., 101, FIG. 1).

A fast response cache (FRC) 130 is provided to enable fast storage and retrieval of data from and to the client. The FRC 130 may be a specially configured memory device, such as but not limited to commercially available memory devices including the so-called XL-Flash™ memory from Toshiba Corporation, and the so-called Z-NAND™ from Samsung. Other competing solutions may be offered from other sources, such as but not limited to the so-called Optane™ phase change (ReRAM) memory from Intel Corporation.

The FRC 130 is contemplated as operating as an SLC flash memory (e.g., a single level cell so that each memory cell is adapted to store only a single bit of data), but is specially configured through the use of enhancements to circuit arrangements, drivers, buffers, etc. that provide lower latency and extended life. For example and not by way of limitation, read/programming (write) times for the FRC 130 may be on the order of 5 us/100 us as compared to read/programming times for conventional memories (including conventional flash memories configured as SLCs) of on the order of 50 us/500 us. For purposes of the present discussion, the memory cells of the FRC 130 will be referred to herein as XL NAND memory cells.

At this point it will be appreciated that it is well known to designate different portions of a flash array as different configurations, that is, to make some portions SLC only, while other portions can be designated as MLC (2 bits per cell), TLC (3 bits per cell), XLC (4 bits per cell), PLC (5 bits per cell), etc. Thus, XL NAND should be viewed as a specially configured die/set configuration with drivers and other supporting circuitry that only support the writing of a single bit to each cell, irrespective of the underlying technology used to construct and operate the individual cells. Stated another way, the XL NAND cells of the FRC 130 are not capable of storing more than a single bit of data when operated as XL NAND memory cells. As noted above, the XL NAND is contemplated as comprising specially configured fast flash cells, but other constructions, including non-flash based semiconductor memory cells, can be utilized as desired.

Continuing with FIG. 2, a device management module (DMM) 132 supports back end processing operations. The DMM 132 includes an outer code engine circuit 134 to generate outer code, a device I/F logic circuit 136 to provide data communications, and a low density parity check (LDPC) circuit 138 configured to generate LDPC codes as part of an error detection and correction strategy used to protect the data stored by the by SSD 110.

A memory module 140 corresponds to the memory 106 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
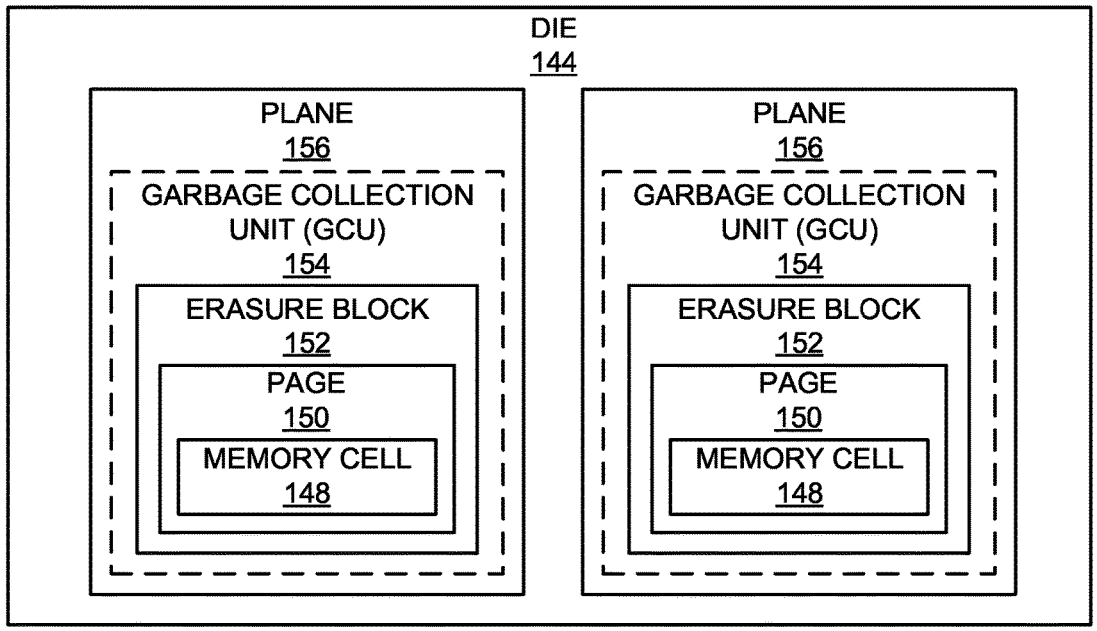
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups (e.g., rows) of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; some current generation flash memory pages are arranged to store 32 KB (32,768 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical storage units that utilize erasure blocks across different dies. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
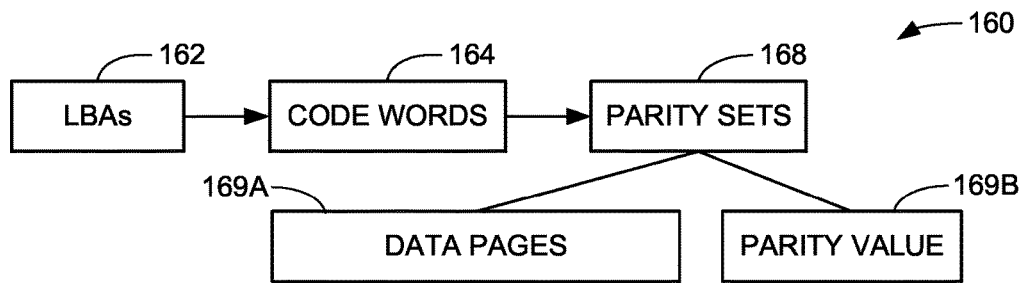
FIG. 4 illustrates a data flow of the SSD of FIG. 2.

FIG. 4 provides a data flow sequence 160 to describe the processing of input user data from a client device such as 101 in FIG. 1. Other arrangements can be used. User data blocks with associated logical addresses are represented at 162. The logical addresses may be logical block addresses (LBAs), but other forms can be used including key values, virtual block addresses, etc. Prior to storage in the flash memory 142, the blocks are accumulated into code words 164, which include user data bits and error correction code (ECC) bits. The ECC bits may take the form of LDPC (low density parity check) bits and are used in decoder circuitry to correct bit errors in the user data bits during a read operation.

A selected number of the code words may be arranged into pages, and a selected number of pages may in turn be arranged into parity sets 168. In one non-limiting example, 31 pages of code words are combined such as through an exclusive-or (XOR) operation to generate a parity (ECC) value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure. In this example, the 31 data pages are represented by block 169A, and the 32nd data page that stores the parity ECC value is represented by block 169B.

Figure 5:
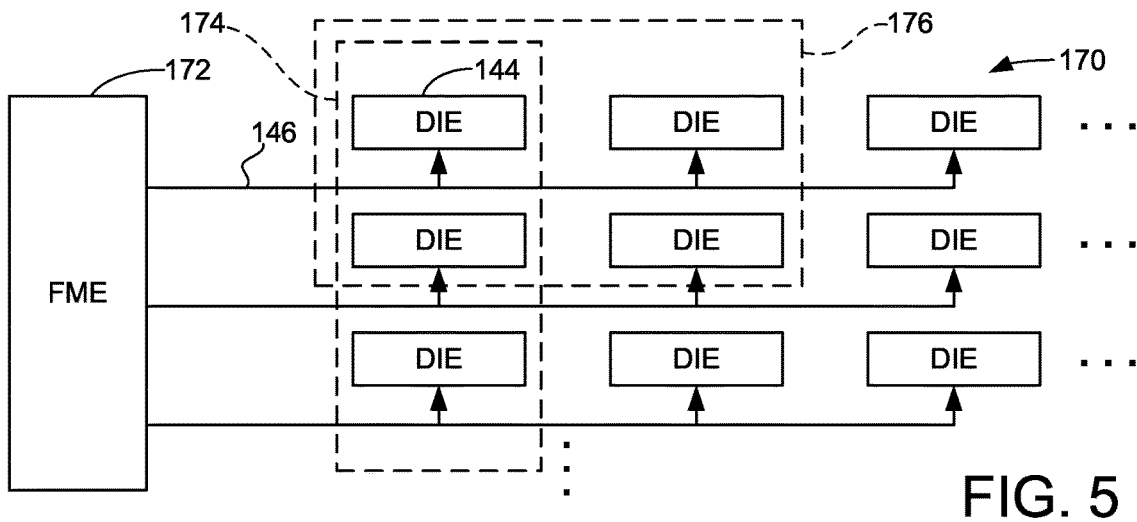
FIG. 5 shows the flash memory of FIGS. 2-3 arranged as semiconductor dies interconnected via channels (lanes) in some embodiments.

FIG. 5 shows further aspects of the flash memory 140 in some embodiments. The dies 144 are arranged into die sets 170, with each of the dies in each die set coupled via a corresponding channel 146 (FIG. 2). In this way, a single die in each die set can be accessed at a time via I/O communications along the associated channel. A flash memory electronics (FME) circuit 172 manages commands and data transfers from the DMM circuit 132. This allows parallel operations, since data transfers can concurrently be carried out along each of the various channels 146 to the respective die sets 170 as required. Without limitation, one embodiment can utilize 256 dies with eight (8) channels, so that each die set incorporates 32 dies. Other arrangements can be used.

In accordance with the NVMe standard, groupings of dies (or portions of dies) can be further arranged into so-called NVMe sets, such as depicted at 174 and 176. The available storage memory within the NVMe sets can be assigned to NVMe namespaces in accordance with the NVMe standard and made available to assigned users (owners) for the storage of data. NMVe namespaces can encompass a portion of, an entire, or multiple SSDs or other data storage devices, and can each be supplied with a different logical/virtual address space.

Figure 6:
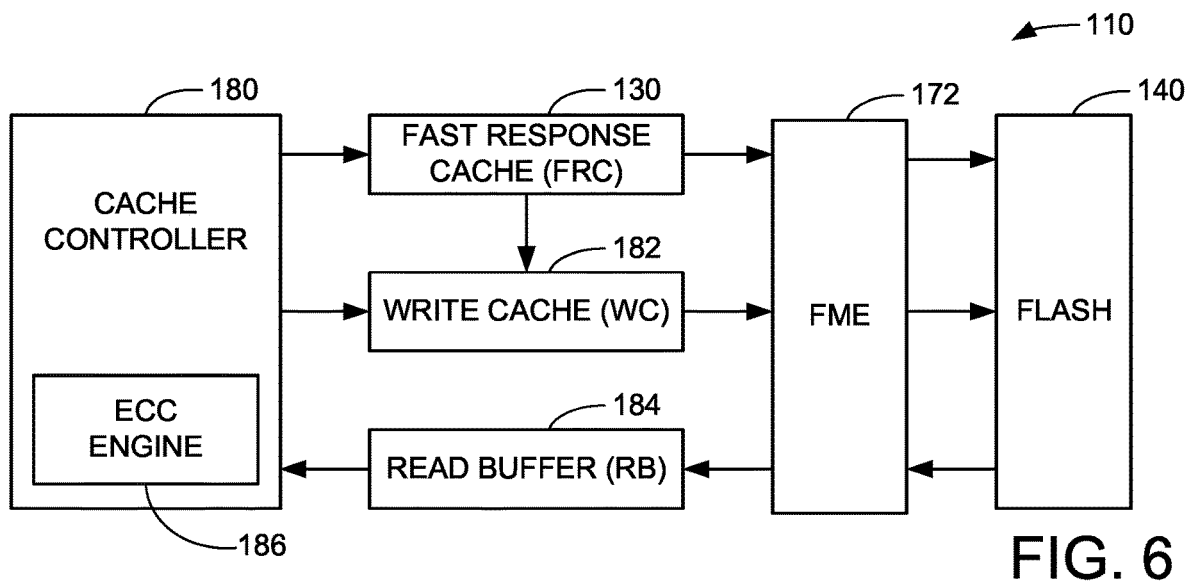
FIG. 6 is a functional representation of the SSD of FIG. 2 showing inclusion of a fast response cache (FRC) in accordance with some embodiments.

FIG. 6 shows further aspects of the SSD 110 in some embodiments. A cache controller 180 is realized as part of the SSD controller 112 (FIG. 2) and manages data transfers to and from various intermediate memory locations during the servicing of client data transfer commands. These intermediate memory locations include the FRC 130 from FIG. 2, a write cache (WC) 182 and a read buffer (RB) 184. The cache controller further incorporates an error correction encoding (ECC) engine 186 to generate ECC code words to protect the data during transfers to the main memory (flash 140). As noted above, the FRC 130 can take any number of different NVM constructions as desired, including but not limited to fast flash, RRAM, MRAM, STRAM, PcRAM, ferroelectric memory, etc.

In at least some embodiments, it will be understood that the FRC 130 is faster memory, from a latency response standpoint, than the main memory (MM e.g. flash 140) and the write cache (WC) 182. Stated another way, writing and reading operations upon the memory cells in the FRC will be completed in a shorter amount of elapsed time as compared to corresponding operations upon either the MM 140 or the WC 182. In this way, if the NVM cells of the MM have a first latency response, and the NVM cells of the WC have a second latency response, then the NVM cells of the FRC will have a third latency response that is faster than the first and second latency responses of the NVM cells of the MM and the WC, respectively.

Figure 7:
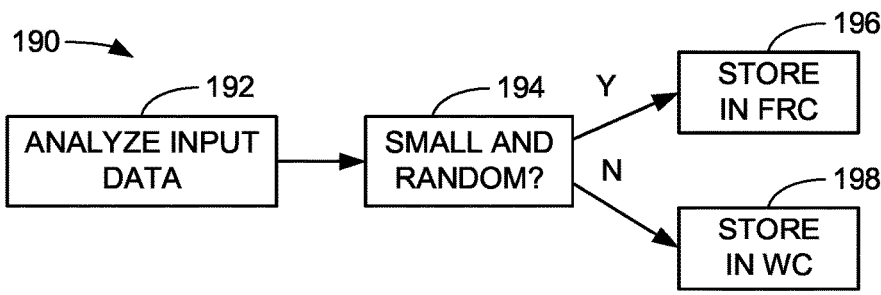
FIG. 7 is a decision diagram illustrating decisions to direct input write data along different data paths in FIG. 6.

FIG. 7 is a decision tree illustrative of logic applied by the cache controller 180 of FIG. 6 when presented with write data from the client 101. Block 192 shows an analysis of the input data. This may include reference to history data accumulated by the controller indicative of recent data access commands. Block 194 is a decision block that determines whether a given write request command can be classified as small and random (e.g., the overall amount of data is relatively small, and the logical addresses associated with the write data are not sufficiently proximate to other recent data transfer requests). If the requirements of block 194 are satisfied, the flow passes to operational block 196 in which case the presented write data from the client are stored in the FRC 130. Contrawise, if the requirements of block 194 are not satisfied, the data are passed directly to the WC 182 for normal processing into parity sets as discussed above in FIG. 4, as indicated by block 198.

Figure 8:
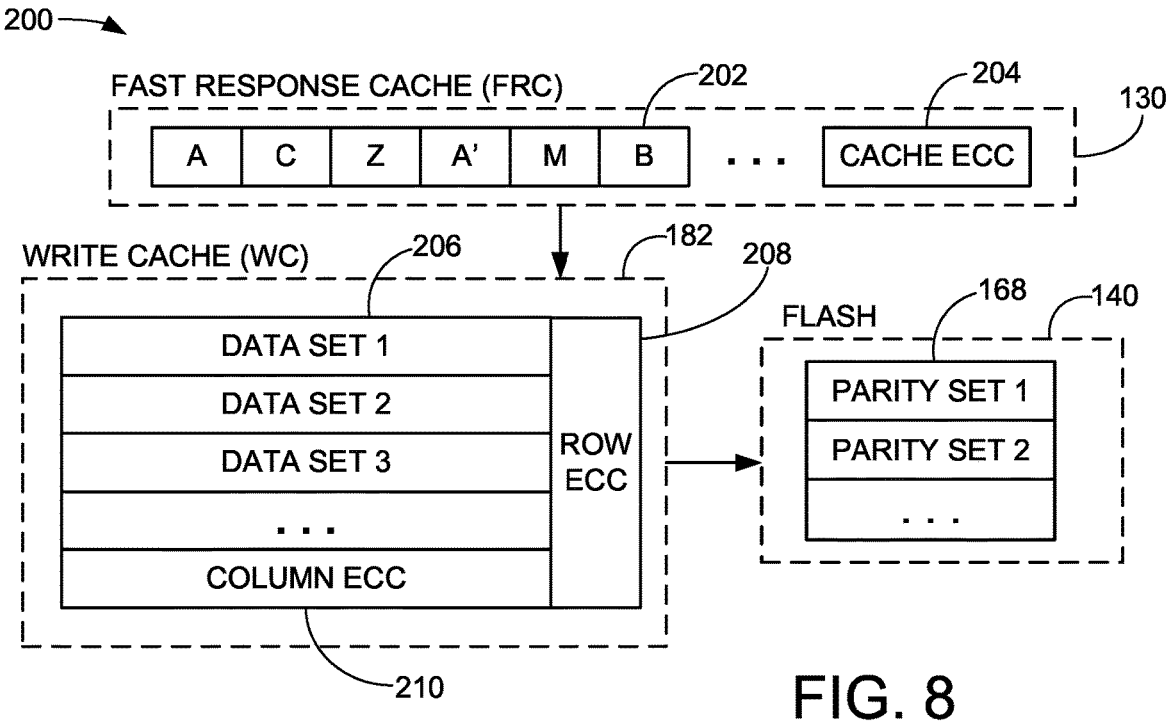
FIG. 8 shows further aspects of the operation of the SSD from FIG. 6 in greater detail.

FIG. 8 shows a processing circuit 200 of the SSD 110 in further embodiments. The circuit 200 shows processing via the block 196 in FIG. 7. Data blocks 202 received from the client are stored sequentially to the FRC 130 as shown. These blocks are arbitrarily denoted as blocks A, C, Z, A', M, B, etc. A' represents an updated version of the block A. These designations correspond to some range of logical addresses for the blocks written to the FRC 130.

The blocks 202 are accumulated into the FRC 130, and are protected via a cache ECC block 204. The cache ECC block 204 represents a first type of ECC processing supplied by the ECC engine 186 of the cache controller 180 (see FIG. 6). Substantially any suitable form of ECC processing is supplied including XOR, BCH, RS, LDPC, etc. The ECC can be for the entirety of the contents of the FRC 130, or can be divided out to protect subsets of the contents, including in different directions (e.g. time-wise groupings, logical groupings, etc.).

At appropriate times, the data sets (which constitute write data to be ultimately transferred to the main memory flash) are transferred by the cache controller 180 from the FRC 130 to the WC 182. The groupings are applied to enable sets of data to be rearranged into logically proximate groupings or other groupings that provide enhancements during the servicing of subsequent read operations. Thus for example, the prior version data A may be jettisioned from the cache and the updated version A' may be grouped with other data sets (e.g., B, C, D, etc.) that are logically proximate. Data may persist in the FRC 130 until either a timeout condition is reached or until data having sufficient logical proximity is received from the client that makes it advantageous to proceed with combining such into a data transfer to the flash.

The data stored in the WC may be also protected using a different, second ECC scheme (ECC2). The data are shown as respective data sets 206, which may correspond to the data content of the parity sets 168 in FIG. 4 or may be other groupings of data. Each data set 206 is protected by a row ECC value 208. The row ECC value is a different, second type of ECC suitable for the size and type of the data in the associated data set. As desired, additional ECC can be provided such as illustrated by a column ECC value 210. In this case, the column ECC value(s) 210 may be calculated across portions of each of the data sets 206.

Once the data have been processed, the data are transferred from the WC 182 to the flash 140 (via the FME 172) into the parity sets 168 described above. It will be noted that the row ECC values 208 can correspond to the parity values 169B (FIG. 4), or can be different values so that the parity values stored to the flash constitute a third form of ECC values.

In this way, data in the FRC 130 (FIG. 6) are protected by a first form of ECC, referred to above as ECC1. This allows the system to verify and maintain the integrity of the data stored therein as the FRC 130 accumulates data to be written to the main memory (e.g., flash 140). It will be noted that the first form of ECC is provided to protect the data in the cache and may or may not be used for subsequent protection by the flash 140. This first form of ECC provides time for the system to arrange the data transfers to the flash (or other main memory), which as described above involves a second form of ECC which is applied to the data sets that are ultimately written to the main memory. In some cases, the first form of ECC can be embedded within and form a part of the data written to the main memory and protected by the second form of ECC therein. Stated another way, some of the time pressures to get data written to the main memory can be alleviated by allowing data to accumulate into the FRC 130 (such as random writes), since an additional layer of protection is provided for the contents of the FRC using the first level of ECC protection.

In some cases, the data in the FRC 130 can be transferred to the final storage location (e.g., flash 140) without separately passing the data through the WC 182. This can reduce loading requirements upon the system. The first form of ECC (ECC1) can be the final form of ECC used by the storage of the data to the main memory, provided some sort of identifier value is provided to indicate whether data are sent using the first form of ECC. This identifier value is required to enable the readback process to understand which form of ECC has been applied to the stored data. This can be easily handled using downstream processing (see e.g., FIG. 2).

In alternative cases, data forwarded from the FRC directly to the main memory (e.g., flash 140) can be appended with or substituted with the second form of ECC from the ECC engine 186 (FIG. 6). This second form of ECC is sometimes referred to as ECC2. In this way, the first form of ECC serves the necessary function of protecting the data stored in the FRC until such time that it is appropriate to send the data to the flash, after which the second form of ECC takes over. The copy of the first data and the first ECC can be retained until such time that a successful transfer is confirmed, after which the data in the FRC (including the user data and the associated first form of ECC) are jettisoned to make room for new data.

From the foregoing description, it can be seen that it is not necessarily important what the actual construction is of the FRC 130, so long as it can operate to quickly receive and store, in a secure way, the data elements or segments written thereto, as well as accommodate the first ECC values. Different forms of memory will each provide different advantages.

Figure 9:
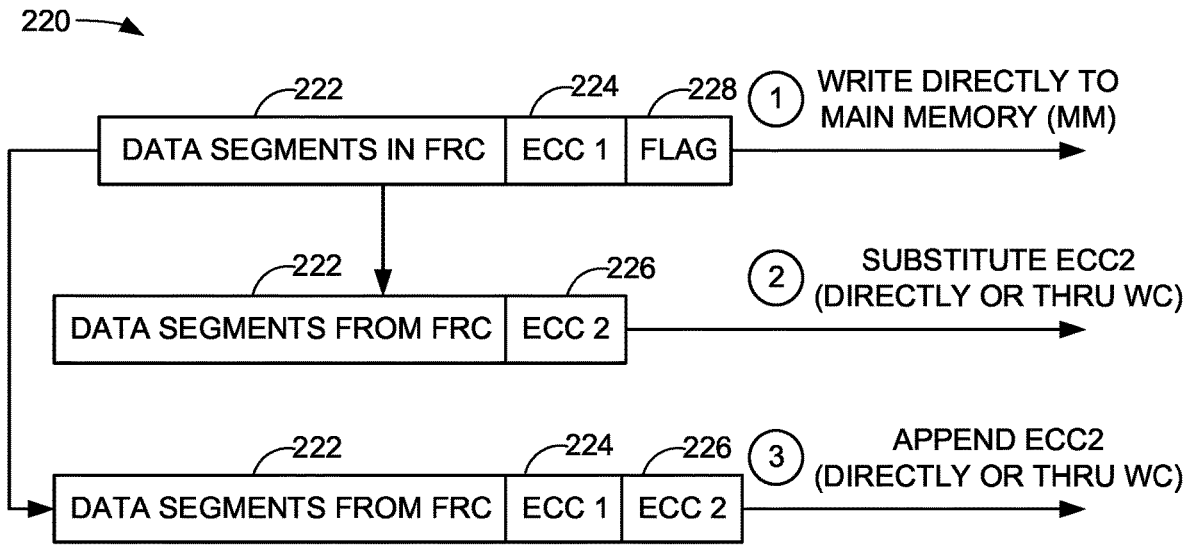
FIG. 9 is a flow diagram that illustrates different data paths that can be taken for data segments loaded to the FRC of FIG. 6.

FIG. 9 provides a sequence diagram 220 to illustrate the foregoing discussion. Data segments that have been loaded into the FRC (e.g., FRC 130 in FIG. 6) are represented at 222. A first type of ECC ("ECC1") 224 is generated and stored in the FRC as well. The ECC1 can be generated and updated as additional segments are loaded, or the system can wait until a sufficient amount of data has been accumulated before the ECC1 is generated.

As the segments are accumulated, portions of the accumulated data can be piece-wise transferred to the write cache (WC) 182. For example, during a sequential write, if a segment of a logical address range of blocks is received out of order (either early or late), the out of order range of blocks can be stored to the FRC and then inserted at an appropriate time into other accumulated data in the WC. Writing sequential groups of data (sequential LBAs, etc.) to the main memory can make readback processing more efficient. Another advantage to using the FRC to provide piece-wise insertion into data sets in the WC is that, generally, the segments being provided are apt to change more quickly than other sets of write data; hence, the FRC may receive multiple successive versions of the same segments. Each of these can be successively protected with ECC, and the latest version can be transitioned to the WC at an appropriate time (and the prior versions can be jettisoned).

Alternatively, the accumulated segments of data may be written separately to the main memory as a complete block of data, such as a 4 KB data block, etc. In these circumstances, this data block can be passed directly to the main memory (e.g., flash 140), or can be passed through the WC 182 for transfer to the flash using normal processing.

If the data block is passed directly to the flash 140, the ECC1 can continue to be used, or can be replaced with the second type of ECC ("ECC2"), as denoted at 226. For example, FIG. 9 shows a first path (1) where the data block is sent directly from the FRC 130 to the flash 140 while maintaining the ECC1 type of protection. Since this is different from the ECC2 encoding normally used by the flash, a flag bit 228 may be appended as shown to enable the system to apply different decoding for this data set during a subsequent read operation.

A second data path (2) is shown wherein the data block is forwarded to the WC 182, the ECC1 codes are removed, and new ECC2 encoding is applied (field 226), as with normal processing. An alternative to this second path is that the ECC2 encoding is generated and applied to the data block without movement of the data block to the WC.

A third data path (3) is similar to data path (2), except that the ECC1 encoding words are maintained as part of the data block, and the ECC2 code words are generated to protect both the data segments and the ECC1 encoding. This provides a multi-layer protection scheme, which can be useful in further ensuring the integrity of the underlying bits of the data segments from the FRC. As before, this can be carried out directly or through the WC. Flag bits such as 228 can be appended in this arrangement to alert the system that both ECC1 and ECC2 are present in the stored data.

Figure 10:
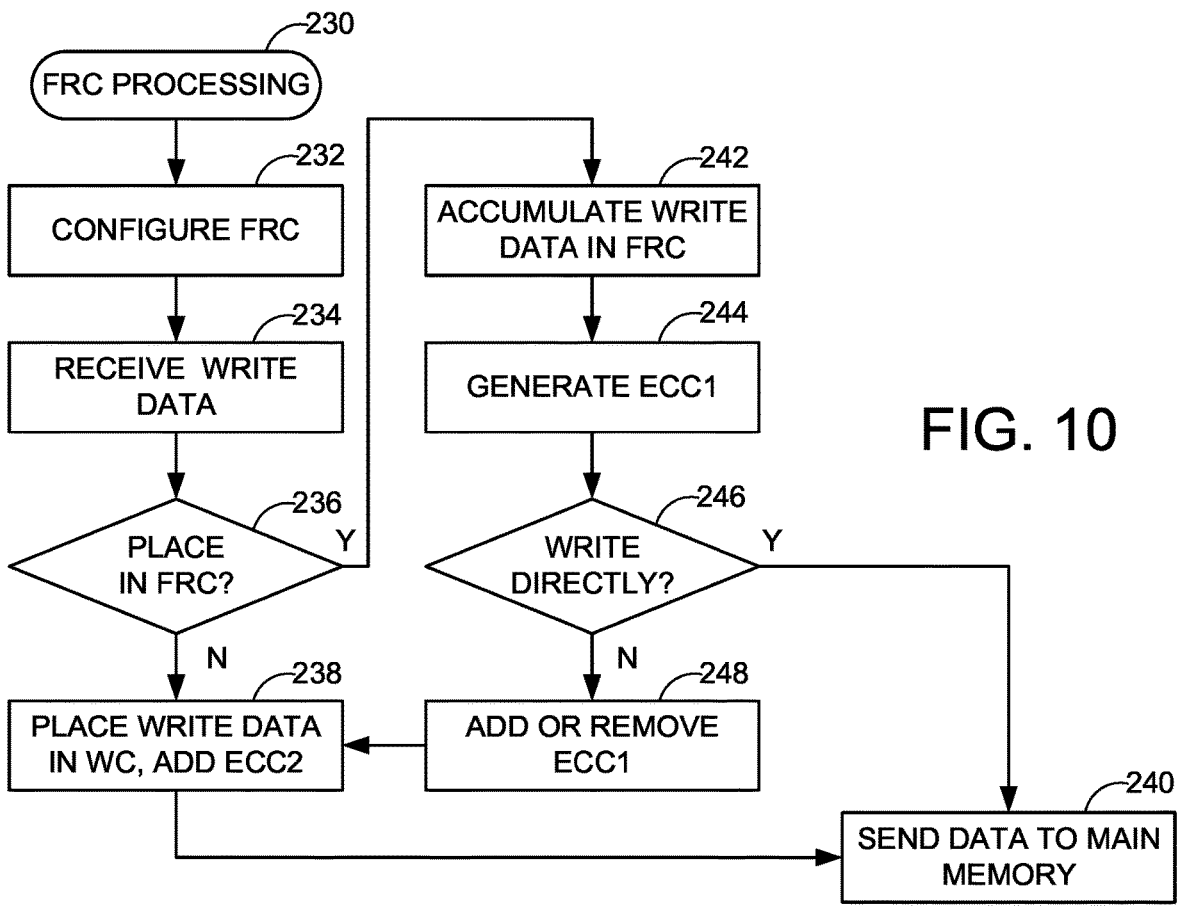
FIG. 10 is a flow chart for an FRC process to illustrate steps that can be carried out in accordance with some embodiments.

FIG. 10 provides a flow chart for an FRC processing routine 230 in accordance with some embodiments. The processing commences at step 232 where a fast response cache (FRC) is initially configured. As discussed above, this may take the form of high speed SLC flash, or some other memory configuration including non-flash based solutions.

Write data sets begin to be received at step 234, such as from an external host (e.g., 101, FIG. 1). Write data sets can also be generated internally, such as in the form of metadata, relocated data during garbage collection, etc. Decision step 236 determines whether the write data sets should be located in the FRC or in the WC. This corresponds to the processing set forth above in FIG. 4.

If the data are to be directed to the WC 182, the flow passes to step 238 where appropriate error correction codes (ECC2) are generated, and other processing is applied as required. Thereafter, the data are sent to the main memory (e.g., flash 140) for storage at step 240.

When the data sets are to be temporarily stored in the FRC, the flow passes to steps 242 and 244 where the data are accumulated and appropriate error correction codes (ECC1) are generated. Decision step 246 determines whether the data accumulated in the FRC are to be written directly to the main memory. If so, the flow passes directly to step 240. If not, the flow passes to step 248 where the ECC1 is added (retained) or removed, as desired (see FIG. 9). After this, the data are passed to steps 238 and 240 for processing as before.

The ECC1 code words selected and stored in the FRC 130 can be selected based on the target location in the MM to which the associated segments are to be stored. This can include on a die, chip, namespace or other basis as desired. In this way, the ECC1 code words can more seamlessly integrate with the other data stored at the target location, including operability with the ECC2 code words used to protect adjacent data.

The controller provides intelligent copyback through the use of determining which segments to send to the WC to be incorporated into existing map units, when to send an entire set of data to the WC for processing, and when to direct the data to the main memory while bypassing the write cache. Intelligent copyback further is implemented by selecting, as required, appropriate forms of the ECC1 code words to better integrate with the baseline system (e.g., ECC2).

It will now be appreciated that the use of a fast response cache as variously embodied herein can provide a number of benefits. Small segments of write data can be separately accumulated and protected using a first type of ECC (ECC1) until an appropriate time is reached to process the write segments. The ECC1 provides protection over and above that provided by the NVM characteristics of the FRC. Multi-axis and multi-level ECC techniques can be applied as required to protect the write segments in the cache. The ECC1 can be selected based on target locations in the main memory to which the segments will ultimately be written; in this way, ECC techniques can be applied that seamlessly interact with the existing ECC scheme (ECC2) of the system.

The segments can be transferred to a write cache as a block or in a piece-wise fashion for inclusion into larger data sets, such as map units, where a second type of ECC (ECC2) is generated and appended prior to transfer to the main memory.

While various embodiments have contemplated the environment of an SSD, other environments including other forms of data storage devices (e.g., hard disc drives HDD, hybrid drives, etc.) can be used. Moreover, while fast response SLC flash devices are contemplated, other forms of memory, such as but not limited to RRAM, STRAM, MRAM, PcRAM, ferroelectric memory, etc. can be used for the FRC.

While the environment of an SSD has been used to illustrate various embodiments, it will be understood this is merely for purposes of example and is not limiting. The various embodiments presented herein can be adapted for use in substantially any form of data processing environment.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. Apparatus comprising:
a main memory (MM) comprising non-volatile memory (NVM) cells configured for persistent storage of user data;
a fast response cache (FRC) comprising NVM cells configured to provide storage of first data prior to transfer to the MM;
a write cache (WC) comprising NVM cells configured to provide storage of second data prior to transfer to the MM; and
a controller configured to apply a first type of error correction encoding (ECC1) to the first data in the FRC by generating and storing ECC1 code words associated with the first data to the FRC, and to apply a different, second type of error correction encoding (ECC2) to the second data in the WC by generating and storing ECC2 code words associated with the second data to the WC.

2. The apparatus of claim 1, wherein the controller is further configured to transfer the first data from the FRC to the WC prior to transfer of the first data to the MM.

3. The apparatus of claim 2, wherein the controller jettisons the ECC1 code words and generates a corresponding set of ECC2 code words for the first data transferred from the FRC to the WC.

4. The apparatus of claim 2, wherein the controller is further configured to retain the ECC1 code words associated with the first data and generates the ECC2 code words for both the first data and the ECC1.

5. The apparatus of claim 1, wherein the controller is further configured to direct a transfer of the first data and the ECC1 code words directly to the MM from the FRC without passing the first data through the WC.

6. The apparatus of claim 1, wherein the FRC comprises flash memory cells specially configured to only store a single bit in each flash memory cell as an SLC (single level cell).

7. The apparatus of claim 1, wherein the FRC comprises at least a selected one of resistive random access memory (RRAM), magnetic random access memory (MRAM), spin-torque transfer random access memory (STRAM), phase change random access memory (PcRAM), or ferroelectric memory.

8. The apparatus of claim 1, wherein the ECC1 code words stored in the FRC are generated and updated as each of a succession of segments of the first data are accumulated into the FRC.

9. The apparatus of claim 1, wherein once a sufficient amount of the first data are accumulated into the FRC, the sufficient amount of the first data are characterized as a block of selected size, and the block of selected size is transferred to the WC.

10. The apparatus of claim 1, wherein the MM is characterized as a flash memory of a solid-state drive (SSD) data storage device.

11. The apparatus of claim 10, wherein the WC is formed of flash memory and the FRC is formed of flash memory.

12. The apparatus of claim 10, wherein the WC is formed of flash memory and the FRC is not formed of flash memory.

13. The apparatus of claim 1, wherein the NVM cells of the MM have a first latency response, the NVM cells of the WC have a second latency response, and the NVM cells of the FRC have a third latency response that is faster than the first and second latency responses of the NVM cells of the MM and the WC, respectively.

14. The apparatus of claim 1, wherein the ECC1 is selected responsive to a target location in the MM to which the first data are to be stored.

15. A method comprising:
receiving a set of write data for storage to a main memory (MM) of a data storage device, the MM comprising non-volatile memory (NVM) cells configured for persistent storage of the set of write data;
directing the set of write data to a fast response cache (FRC) comprising NVM cells configured to provide storage of the set of write data prior to transfer to the MM responsive to a characteristic associated with the set of write data;
protecting the set of write data in the FRC by applying a first type of error correction encoding (ECC1) in the form of ECC1 code words written to the FRC;
subsequently transferring the set of write data from the FRC to the MM and applying a different, second type of error correction encoding (ECC2) in the form of ECC2 code words written with the set of write data to the MM.

16. The method of claim 15, wherein the set of write data in the FRC are transferred to a write cache (WC), and wherein the ECC2 code words are generated and written to the WC prior to the transfer of the set of write data and the ECC2 code words to the MM.

17. The method of claim 16, wherein the ECC2 code words protect both the set of write data and the ECC1 code words in the WC.

18. The method of claim 15, wherein the ECC1 code words are selected in response to a target location in the MM for the set of write data.

19. The method of claim 15, wherein the NVM cells of the MM have a first latency response, and the NVM cells of the FRC have a second latency response that is faster than the first latency response of the NVM cells of the MM.

20. An apparatus comprising:
a main memory (MM) comprising non-volatile memory (NVM) cells configured for persistent storage of first user data;
a write cache (WC) comprising NVM cells configured to provide temporary storage of second user data prior to transfer to the MM;
a fast response cache (FRC) comprising NVM cells configured to provide temporary storage of third user data prior to transfer to either the WC or the MM; and
a controller circuit configured to generate and store a first form of error correction code (ECC1) code words in the FRC to protect the third user data stored in the FRC, and to transfer the third user data and the corresponding ECC1 code words from the FRC either directly to the MM with a flag value or indirectly to the MM through the WC with an additional set of a second form of error correction code (ECC2) code words that protect the third user data and the ECC1 code words in the MM.

21. The apparatus of claim 20, wherein the MM has a first read/write latency response, the WC has a second read/write latency response faster than the first read/write latency response, and the FRC has a third read/write latency response faster than the second read/write latency response.

22. The apparatus of claim 20, wherein a presence of the flag value indicates protection of the third user data using the ECC1 code values, and wherein an absence of the flag value indicates protection of the third user data using the ECC2 code values.

* * * * *